United States Patent [19]

Ichiki et al.

[11] Patent Number: 5,195,934
[45] Date of Patent: Mar. 23, 1993

[54] DIFFERENTIAL DEVICE FOR VEHICLE

[75] Inventors: Shiro Ichiki; Hideyasu Takefuta, both of Saitama, Japan

[73] Assignee: Diesel Kiki Co., Ltd., Japan

[21] Appl. No.: 784,108

[22] Filed: Oct. 29, 1991

Related U.S. Application Data

[63] Continuation of Ser. No. 521,251, May 8, 1990, abandoned.

[30] Foreign Application Priority Data

Jul. 14, 1989 [JP] Japan .................... 1-180431

[51] Int. Cl.$^5$ .............................................. F16H 1/45
[52] U.S. Cl. ........................................ 475/227; 475/226
[58] Field of Search ......................... 475/226, 227, 228

[56] References Cited

U.S. PATENT DOCUMENTS

| 1,294,040 | 4/1917 | Brown | 475/227 |
| 3,735,647 | 5/1973 | Gleasman | 475/227 |
| 3,884,096 | 5/1975 | Gleasman | 475/227 |
| 4,491,035 | 1/1985 | Gleasman et al. | 475/227 |
| 4,750,483 | 6/1988 | Stritzel | 475/227 |
| 4,954,122 | 9/1990 | Nakao et al. | 475/227 |

FOREIGN PATENT DOCUMENTS

| 0637501 | 3/1962 | Canada | 475/227 |
| 3428865 | 9/1985 | Denmark | 17/34 |
| 3927072 | 3/1990 | Denmark | 1/38 |
| 0313528A2 | 4/1989 | European Pat. Off. |  |
| 893311 | 6/1944 | France | 4/10 |
| 0313528 | 4/1989 | Italy . |  |
| 49-50625 | 5/1974 | Japan . |  |
| 8905933 | 6/1989 | PCT Int'l Appl. | 475/227 |
| 0827730 | 10/1960 | United Kingdom | 475/227 |

Primary Examiner—Leslie A. Braun
Assistant Examiner—Ryan W. Massey

[57] ABSTRACT

A differential device includes a pair of propeller shafts extending into a housing, a pair of side gears connected respectively to the propeller shafts, and at least one pair of element gears having screw gear portions meshing respectively with screw gear portions of the side gears. The element gears have respective coupling gear portions meshing with each other. In order to improve a drive torque distribution, either pitch diameters or helix angles of the screw gear portions of the two side gears are different from each other. In order to reduce the overall diameter of the differential device, a spline portion and the screw gear portion of at least one of the two side gears are spaced from each other along an axis of the side gear, the spline portion serving to connect the side gear to the mating propeller shaft.

11 Claims, 7 Drawing Sheets

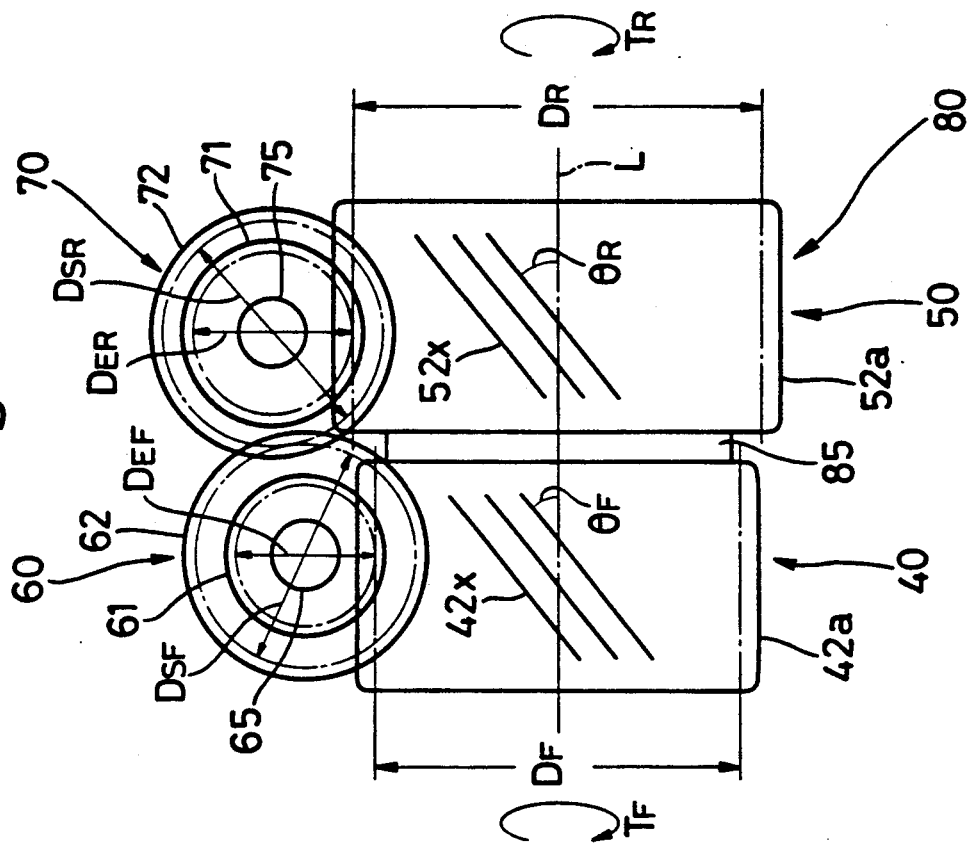

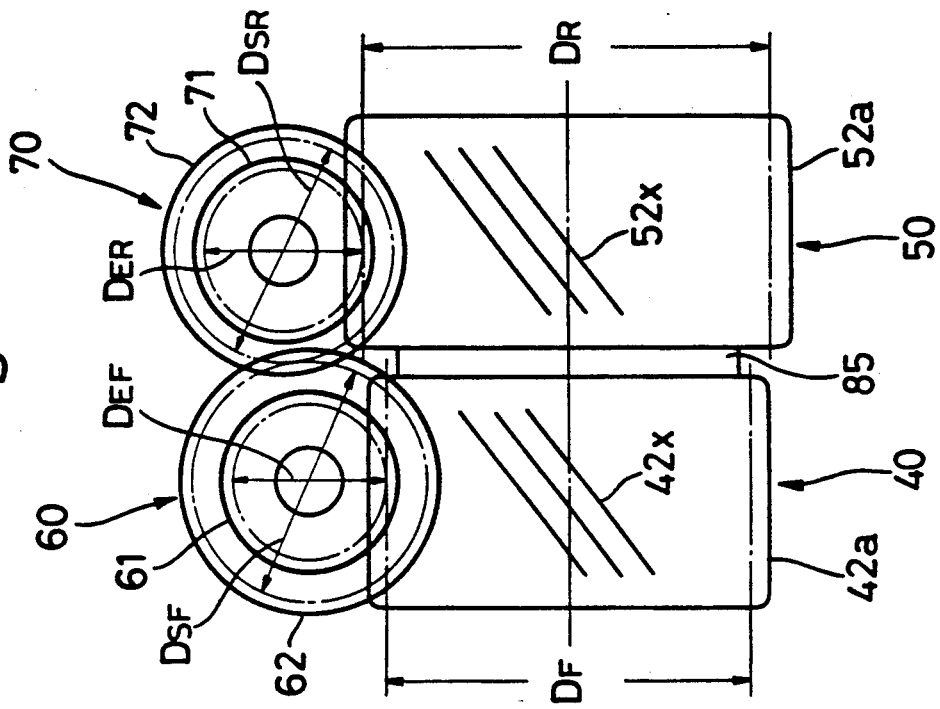
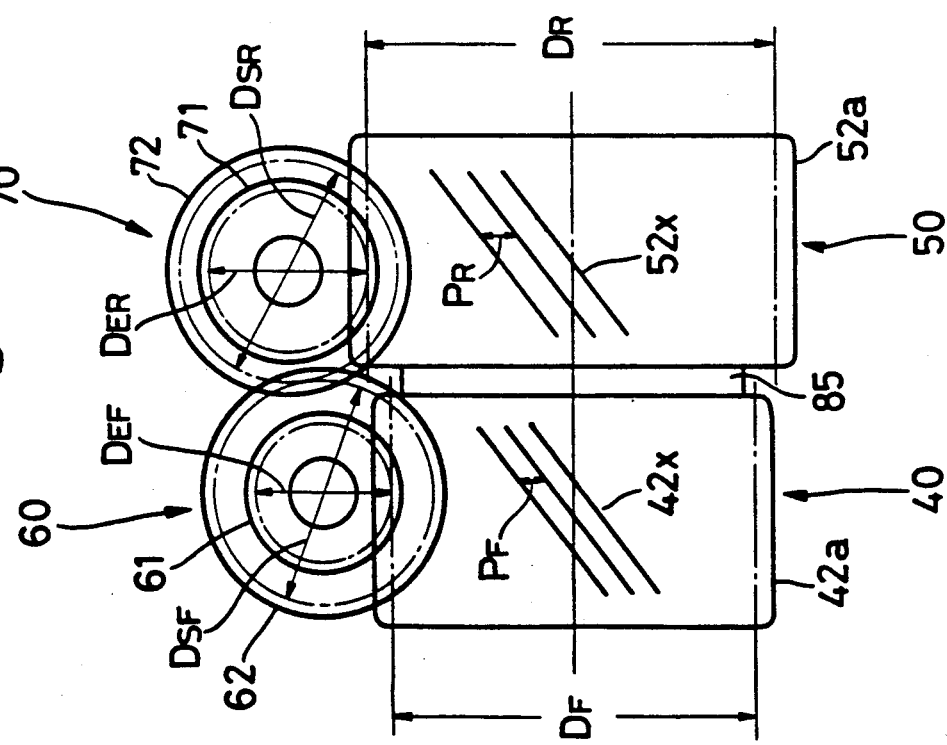

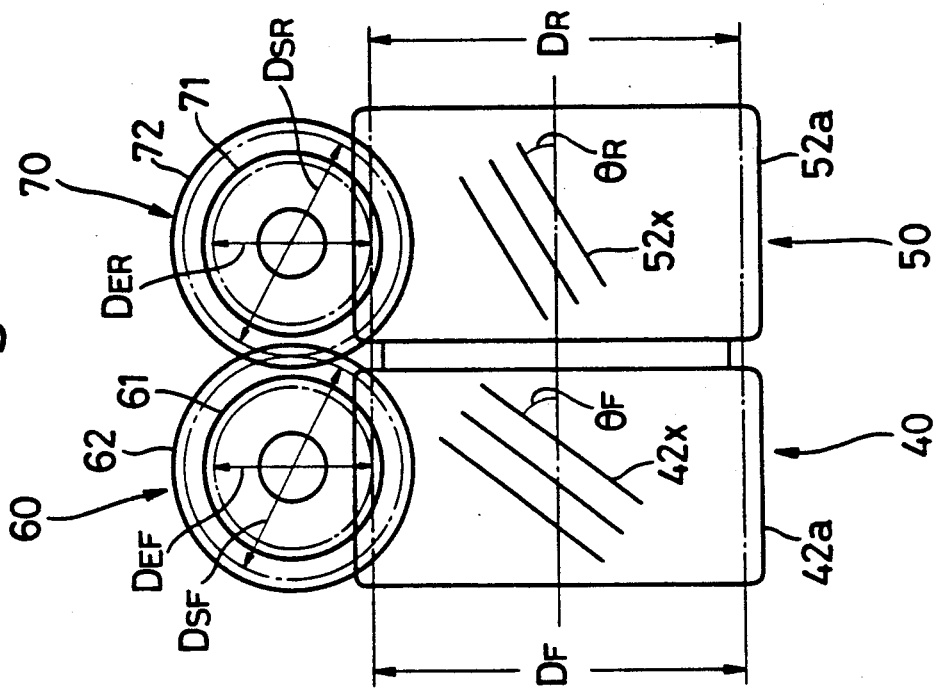
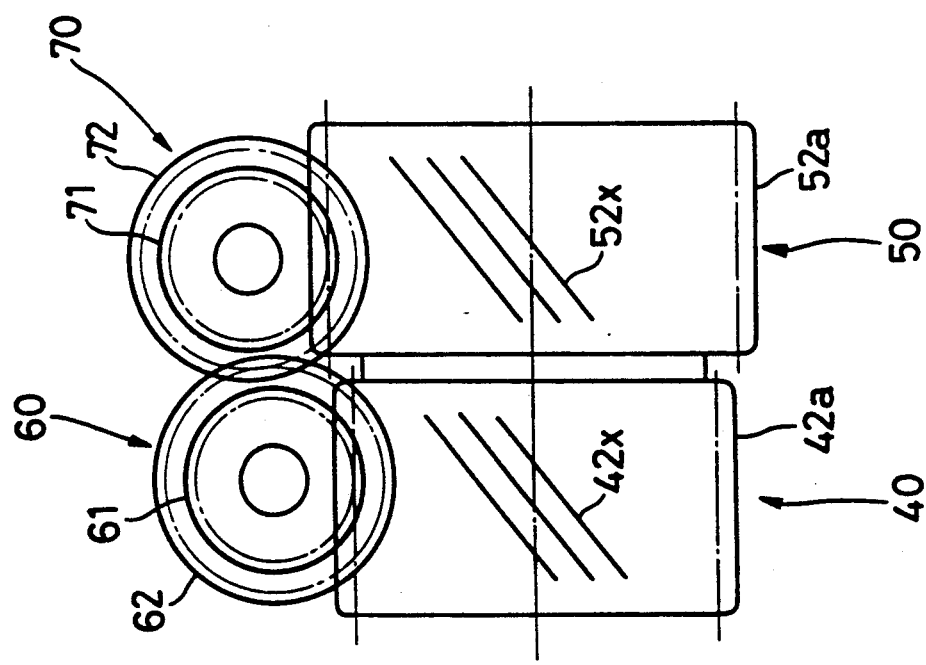

DIFFERENTIAL DEVICE FOR VEHICLE

This application is a continuation of U.S. application Ser. No. 07/521,251, filed May 8, 1990, now abandoned.

BACKGROUND OF THE INVENTION

This invention relates to a differential device for use in a vehicle.

In differential devices disclosed in U.S. Pat. Nos. 3,735,647, 3,884,096, 4,491,035 and 4,750,383 and Japanese Laid-Open (Kokai) Patent Application No. 50625/74, a drive torque applied to those wheels subjected to a larger surface resistance can be made greater than those wheels subjected to a smaller surface resistance. Here, the surface resistance means $\mu \cdot W$ where $\mu$ represents a frictional coefficient of the road surface, and W represents a load applied to tires.

Explanation will be made with respect to the case where the above conventional differential device is used as a center differential device for a four-wheel drive vehicle. The conventional differential device comprises a housing to which the torque is transmitted from an engine, and a pair of propeller shafts (front and rear propeller shafts) extending into the housing. The front propeller shaft is operatively connected to front wheels whereas the rear propeller shaft is operatively connected to rear wheels. The pair of propeller shafts extend along a common straight line, and one ends of the two propeller shafts are disposed in spaced, opposed relation to each other within the housing. A pair of side gears (sun gears) are connected respectively to the one ends of the two propeller shafts by splines, and therefore a transmission of rotation between each propeller shaft and its mating side gear is achieved. A screw gear portion is formed on the outer periphery of the side gear. At least one pair of element gears (planetary gears) are rotatably mounted within the housing. The axis of rotation of the element gear is skew relative to the axis of rotation of the propeller shaft and the axis of rotation of the side gear. Each element gear has a screw gear portion and coupling gear portions. The screw gear portion of each element gear meshes with the screw gear portion of the mating or corresponding side gear, and the coupling gear portions of the two element gears mesh with each other. A differential gear is constituted by the two side gears and the two element gears meshing with the side gears and also with each other.

The pair of side gears are of the same configuration, and also the pair of element gears are of the same configuration.

Reference is now made to how the drive torque transmitted to the housing is distributed by the above center differential device to the pair of propeller shafts, that is, to the front and rear wheels.

First, explanation will be made with respect to a condition in which the surface resistance of the front wheels is equal to the surface resistance of the rear wheels or a condition in which the drive torques of the front wheels and the rear wheels are smaller than a critical value causing a wheel slip (This condition will be hereinafter referred to as "basic condition"). In this condition, the drive torque transmitted to the front wheels are equal to the drive torque transmitted to the rear wheels, and therefore this torque distribution ratio is 50:50 if the torque applied to the housing is represented as 100.

Next, explanation will be made with respect to a condition in which the surface resistance of the front wheels is small, so that assuming that a half of the drive torque of the housing is applied to the front wheels, the front wheels is subjected to slip. In this case, the drive torque of the front wheels is reduced to a value smaller than the critical value causing a wheel slip whereas the drive torque of the rear wheels is increased.

In contrast to the above case, when the surface resistance of the rear wheels decreases, the drive torque of the front wheels increases whereas the drive torque of the rear wheels decreases.

The above torque distribution ratio in accordance with the surface resistance varies in the range of between 25:75 and 75:25.

In the above center differential device, theoretically, the torque distribution ratio can be varied over a wider range, for example, of 10:90 and 90:10. However, if the variation range of the distribution ratio is increased, the differential function may fail to be properly performed, and undue forces develop in the device, which shortens the service life of the device. For these reasons, generally, the above variation is in the range of between 25:75 and 75:25 or around such value.

However, in the case where the above conventional center differential device is used in a vehicle such as a truck in which a greater load acts on the rear side of the vehicle when the vehicle is fully loaded with freight, it is often not possible to apply a sufficient propelling force to the vehicle. More specifically, in such a vehicle having a greater load acting on the rear side thereof, under the normal road surface condition, the surface resistance of the rear wheels is large whereas the surface resistance of the front wheels is small. Particularly, at the time of an abrupt start of the vehicle or at the time of going up a slope, a still greater load acts on the rear side, so that the surface resistance of the rear wheels greatly differs from the surface resistance of the front wheels. In this case, the drive torque which can be transmitted to the front wheels without causing slip becomes very small with the result that the drive torque transmitted to the rear wheels is correspondingly decreased. The reason is that the upper limit of the distribution ratio is 25:75, and therefore the drive torque of the rear wheels is only three times larger than the drive torque of the front wheels. As a result, it is not possible to apply a sufficient propelling force to the vehicle.

Under the above circumstances, it has been desired to develop a center differential device for the above vehicle, in which the torque distribution ratio of the rear wheels to the front wheels is increased as much as possible, while securing a smooth differential function and a long service life.

In the above-mentioned differential device, the side gear is of a cylindrical shape, and the screw gear portion is formed on the outer periphery thereof, and a spline portion is formed on the inner periphery. The screw gear portion and the spline portion are disposed at the same position in the axial direction of the side gear, and this arrangement has offered the following problems.

The spline portion is required to have a sufficiently large diameter so that the spline portion itself can have a strength commensurate with the drive torque to be transmitted by the spline portion, and also that the propeller shaft received in the side gear can have a sufficient strength. Also, the peripheral wall on which the spline portion is formed is required to have a sufficient thickness to have a required strength. For these reasons, the screw gear portion disposed radially outwardly of the spline portion is increased in diameter, and therefore the element gear in mesh with the screw gear portion is remoter from the axis of rotation of the side gear. As a result, the housing containing the side gears and the element gears, as well as a differential case containing the housing, is increased in diameter. Because of such increased diameter of the differential device, it has been necessary either to increase the height of the vehicle or to reduce the vertical dimension of the passenger room or cabin of the vehicle.

SUMMARY OF THE INVENTION

It is a first object of this invention to provide a differential device in which a drive torque distribution ratio of one of front wheels and rear wheels to the other is increased while securing a smooth differential function and a long service life.

A second object of the invention is to provide a differential device in which the diameter of a housing can be reduced, while achieving a sufficient strength of a spline portion of a side gear.

According to a first aspect of the present invention, there is provided a differential device for use in a vehicle having front wheels and rear wheels, comprising:
 (a) a housing connectable to a power source of the vehicle so as to be supplied with a drive torque;
 (b) a pair of front and rear propeller shafts operatively connected to the front and rear wheels, respectively, the pair of propeller shafts extending along a common straight line into the housing, so that one ends of the two propeller shafts are disposed in opposed relation to each other within the housing;
 (c) a pair of side gears connected respectively to the one ends of the pair of front and rear propeller shafts so as to transmit rotations of the two side gears respectively to the two propeller shafts, each of the two side gears having a screw gear portion on its outer periphery, and pitch diameters of the screw gear portions of the two side gears being different from each other; and
 (d) at least one pair of element gears each rotatably mounted on the housing, an axis of rotation of each of the element gears being skew relative to the axis of rotation of the propeller shafts and the axis of rotation of the side gears, each of the element gears having a screw gear portion and a coupling gear portion, the screw gear portions of the pair of element gears meshing with the screw gear portions of the pair of side gears, respectively, and the coupling gear portions of the pair of element gears meshing with each other.

According to a second aspect of the invention, there is provided a differential device for use in a vehicle having front wheels and rear wheels, comprising:
 (a) a housing connectable to a power source of the vehicle so as to be supplied with a drive torque;
 (b) a pair of front and rear propeller shafts operatively connected to the front and rear wheels, respectively, the pair of propeller shafts extending along a common straight line into the housing, so that one ends of the two propeller shafts are disposed in opposed relation to each other within the housing;
 (c) a pair of side gears connected respectively to the one ends of the pair of front and rear propeller shafts so as to transmit rotations of the two side gears respectively to the two propeller shafts, each of the two side gears having a screw gear portion on its outer periphery, and helix angles of the screw gear portions of the pair of side gears being different from each other; and
 (d) at least one pair of element gears each rotatably mounted on the housing, an axis of rotation of each of the element gears being skew relative to the axis of rotation of the propeller shafts and the axis of rotation of the side gears, each of the element gears having a screw gear portion and a coupling gear portion, the screw gear portions of the pair of element gears meshing with the screw gear portions of the pair of side gears, respectively, and the coupling gear portions of the pair of element gears meshing with each other.

The above first object has been achieved by the differential devices of the above first and second aspects.

According to a third aspect of the invention, there is provided a differential device for use in a vehicle having wheels, comprising:
 (a) a housing connectable to a power source of the vehicle so as to be supplied with a drive torque,;
 (b) a pair of shafts each operatively connected to a respective one of the wheels, the pair of shafts extending along a common straight line into the housing, so that one ends of the two shafts are disposed in opposed relation to each other within the housing, and each of the shafts having a spline portion formed on an outer periphery of the one end thereof;
 (c) a pair of hollow side gears connected respectively to the pair of shafts, each of the side gears having a screw gear portion formed on its outer periphery and a spline portion formed on its inner periphery, the spline portions of the two side gears being connected respectively to the spline portions of the two shafts so as to transmit rotations of the two side gears respectively to the shafts, and the screw gear portion and the spline portion of at least one of the two side gears being spaced from each other along an axis of the side gear; and
 (d) at least one pair of element gears each rotatably mounted on the housing, an axis of rotation of each of the element gears being skew relative to the axis of the shafts and the axis of rotation of the side gears, each of the element gears having a screw gear portion and a coupling gear portion, the screw gear portions of the pair of element gears meshing with the screw gear portions of the pair of side gears, respectively, and the coupling gear portions of the pair of element gears meshing with each other.

The above second object has been achieved by the differential device of the above third aspect.

BRIEF DESCRIPTION OF THE DRAWINGS

FIG. 2 is a perspective view of a portion of the differential device, showing an intermeshing between a side gear and element gears;

FIG. 3 is a side-elevational view of the differential device;

FIGS. 4 to 7 are views similar to FIG. 3, but showing modified differential devices, respectively.

DESCRIPTION OF THE PREFERRED EMBODIMENTS OF THE INVENTION

Figure 1:
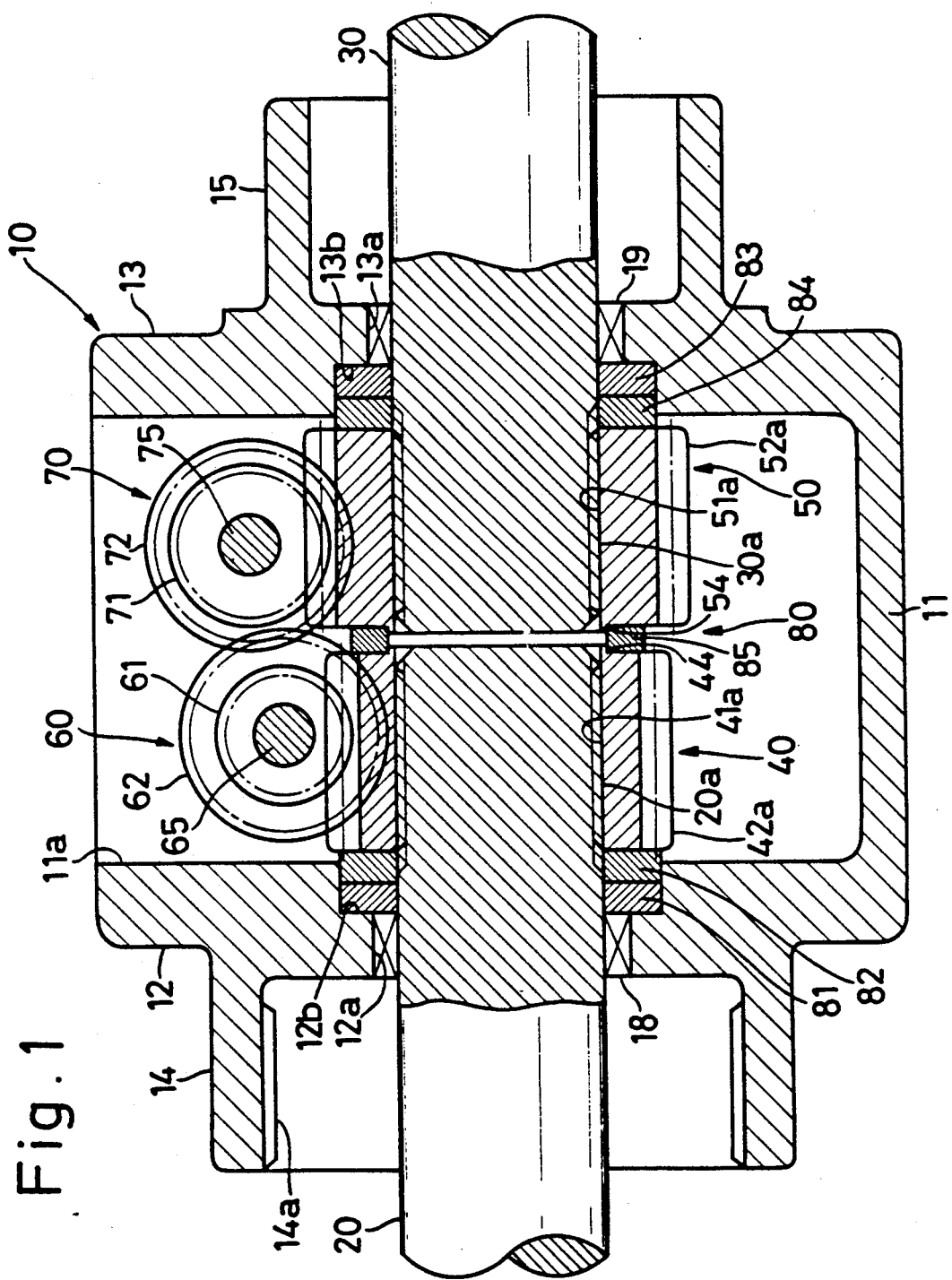
FIG. 1 is a cross-sectional view of a center differential device provided in accordance with the present invention.

A first preferred embodiment of the invention will now be described with reference to FIGS. 1 to 3. FIG. 1 shows a center differential device for a four-wheel drive vehicle. In FIG. 1, the left side of this device is directed toward the front of the vehicle whereas the right side of the device is directed toward the rear of the vehicle. This device comprises a housing 10 which includes a cylindrical portion 11, end walls 12 and 13 formed on opposite ends of the cylindrical portion 11, and auxiliary cylindrical portions 14 and 15 extending respectively from the end walls 12 and 13 along the axis of the cylindrical portion 11. Three openings 11a (only one of which is shown in the drawings) are formed through the peripheral wall of the cylindrical portion 11. A stepped hole 12a having a step 12b is formed through the end wall 12, and similarly a stepped hole 13a having a step 13b is formed through the end wall 13. A spline portion 14a is formed on the inner peripheral surface of the front auxiliary cylindrical portion 14.

The housing 10 is housed in a differential case (not shown), and is rotatably supported on the differential case by bearings (not shown) mounted respectively around the auxiliary cylindrical portions 14 and 15. One end of a hollow shaft (not shown) is received in the auxiliary cylindrical portion 14, and is coupled thereto by spline connection. With this arrangement, a drive torque is transmitted from a power source (engine) to the housing 10 via a clutch, a transmission and the hollow shaft.

A front propeller shaft 20 extends through the hole 12a in the front end wall 12 of the housing 10, and a rear propeller shaft 30 extends through the hole 13a in the rear end wall 13. The two propeller shafts 20 and 30 extend along a common axis or straight line, and are rotatably supported on the housing 10 through bearings 18 and 19 mounted respectively in the outer or reduced-diameter portions of the holes 12a and 13a. The axes of rotation of the propeller shafts 20 and 30 are in alignment with the axis of rotation of the housing 10. These rotation axes (i.e., common axis) are indicated by reference character L in FIG. 3. The front propeller shaft 20 extends through the above-mentioned hollow shaft, and one end of the front propeller shaft 20 disposed exteriorly of the housing 10 is operatively connected to right and left front wheels via a front differential device. One end of the rear propeller shaft disposed exteriorly of the housing 10 is operatively connected to right and left rear wheels via a rear differential device.

The other ends of the two propeller shafts 20 and 30 are received in the housing 10, and are disposed in spaced, opposed relation to each other. Spline portions 20a and 30a are formed on the outer peripheries of the other ends of the two propeller shafts 20 and 30, respectively. A pair of cylindrical side gears (sun gears) 40 and 50, having spline portions 41a and 51a at their respective inner peripheries, are coupled respectively to the other ends of the two propeller shafts 20 and 30 by spline-connection. With this arrangement, a transmission of rotation between the front propeller shaft 20 and the side gear 40, as well as a transmission of rotation between the rear propeller shaft 30 and the side gear 50, is achieved. Screw gear portions 42a and 52a are formed respectively on the outer peripheries of the side gears 40 and 50. As best shown in FIG. 3, a pitch diameter $D_R$ of the screw gear portion 52a of the rear side gear 50 is greater than a pitch diameter $D_F$ of the screw gear portion 42a of the front side gear 40. The two screw gear portions 42a and 52a are equal to each other in various factors such as a module, a pressure angle, a helix angle and so on, and are different from each other only in the number of teeth. The proportion of the number of teeth to the pitch diameter $D_F$ in the screw gear portion 42a is equal to the proportion of the number of teeth to the pitch diameter $D_R$ in the screw gear portion 52a. In FIG. 3, for the sake of simplicity of the illustration, several teeth 42x of the screw gear portion 42a as well as several teeth 52x of the screw gear portion 52a are schematically indicated by solid lines, and their helix angles are indicated by $\theta_F$ and $\theta_R$, respectively.

Three pairs of element gears 60 and 70 are rotatably mounted on the housing 10, and each pair of element gears 60 and 70 are disposed in registry with a respective one of the three openings 11a, respectively. As best shown in FIG. 2, each front element gear 60 has a screw gear portion 61 and a pair of spur gear portions (coupling gear portions) 62 and 62 of a greater diameter formed respectively adjacent to the opposite ends of the screw gear portion 61. A journal pin 65 extends through the element gear 60, and the opposite ends of the journal pin 65 are respectively received in and supported by holes formed respectively in those portions of the peripheral wall of the housing 10 which are disposed respectively on the opposite sides of the mating opening 11a and are spaced from each other circumferentially of the housing 10. The axis of rotation of each element gear 60 is skew relative to the axis L of rotation of the shafts 20 and 30 and the side gears 40 and 50 at an angle of 90°.

Each rear element gear 70 is similar in shape to the front element gear 60, and has a screw gear portion 71 and a pair of spur gear portions 72 and 72. The rear element gear 70 is rotatably mounted on the housing 10 by a journal pin 75. The axis of rotation of each element gear 70 is parallel to the axis of rotation of its mating front element gear 60.

The ratio ($D_{EF}:D_{ER}$) of a pitch diameter of the screw gear portion 61 of the element gear 60 to a pitch diameter of the screw gear portion 71 of the element gear 70 is equal to the ratio ($D_F:D_R$) of the pitch diameter of the screw gear portion 42a to the pitch diameter of the screw gear portion 52a. The screw gear portions 61 and 71 are equal to each other in various factors such as a module, a pressure angle, a helix angle and so on, and are different from each other only in the number of teeth. The proportion of the number of teeth to the pitch diameter $D_{EF}$ in the screw gear portion 61 is equal to the proportion of the number of teeth to the pitch diameter $D_{ER}$ in the screw gear portion 71. A pitch diameter $D_{SF}$ of the spur gear 62 of the element gear 60 is equal to a pitch diameter $D_{SR}$ of the spur gear 72 of the element gear 70.

The screw gear portion 61 of each front element gear 60 is in mesh with the screw gear portion 42a of the front side gear 40. The screw gear portion 71 of each rear element gear 70 is in mesh with the screw gear portion 52a of the rear side gear 50. The spur gear portions 62 and 72 of each pair of element gears 60 and 70 are in mesh with each other. A differential gear 80 is constituted by this meshing arrangement.

Washers 81 and 82 are interposed between the annular step 12b in the end wall 12 and an end face of the side gear 40 facing the step 12b. Washers 83 and 84 are interposed between the step 13b in the end wall 13 and an end face of the side gear 50 facing the step 13b. A washer 85 is interposed between the opposed end faces of the side gears 40 and 50. Annular recesses 44 and 54 are formed respectively in the opposed end faces of the side gears 40 and 50, and the washer 85 is received in the recesses 44 and 54.

In the above construction, a general operation of the center differential device will now be described. The drive torque is first transmitted from the engine to the housing 10 via the hollow shaft, etc., and is further transmitted from the housing 10 to the propeller shafts 20 and 30 via the differential gear 80.

When the vehicle is running or advancing straight without being subjected to slip, the differential gear 80 is in a non-differential condition in which the element gears 60 and 70 are not rotated.

For example, when the vehicle runs along a curved path or road, the differential gear 80 is operated to rotate the element gears 60 and 70, thereby absorbing a difference between the rotational speeds of the front and rear propeller shafts 20 and 30.

In the above non-differential condition, when the surface resistance at the front wheels is equal to the surface resistance at the rear wheels, or when the drive torques applied respectively to the front and rear wheels are less than critical values (determined by the surface resistance) causing a wheel slip (This condition will be hereinafter referred to as "basic condition"), the drive torques $T_F$ and $T_R$ distributed from the housing 10 respectively to the front and rear propeller shafts 20 and 30 are different from each other, and this distribution ratio is equal to the ratio ($D_F:D_R$) of the pitch diameter of the screw gear portion 42a to the pitch diameter of the screw gear portion 52a. This is expressed by the following formula:

$$T_F:T_R = D_F:D_r$$

More specifically, the drive torque from the housing 10 is distributed to the side gears 40 and 50 through the element gears 60 and 70. At this time, the transmissions of the forces from the element gears 60 and 70 to the side gears 40 and 50 are effected respectively through a point of contact between the screw gear portions 42a and 61 and a point of contact between the screw gear portions 52a and 71.

Therefore, the torque distribution ratio ($T_F:T_R$) of the front propeller shaft 20 to the rear propeller shaft 30 is equal to the ratio of the distance between the above first-mentioned contact point and the rotation axis L and the distance between the above second-mentioned contact point and the rotation axis L, and therefore is substantially equal to the ratio ($D_F:D_R$) of the pitch diameter of the side gear 40 to the pitch diameter of the side gear 50.

In this embodiment, the diameter $D_R$ of the rear side gear 50 is greater than the diameter $D_F$ of the front side gear 40, and therefore in the above basic condition, the drive torque $T_R$ (i.e., the sum of the drive torques transmitted respectively to the right and left rear wheels) transmitted to the rear propeller shaft 30 is greater than the drive torque $T_F$ (i.e., the sum of the drive torques transmitted respectively to the right and left front wheels) transmitted to the front propeller shaft 20. In this case, according to the need, the ratio of $T_F:T_R$ may be, for example, 45:55 or 35:65.

When the surface resistance at the front wheels is different from the surface resistance at the rear wheels, the torque distribution ratio varies in accordance with the surface resistances, based on the torque distribution ratio in the above basic condition.

Since the mechanism of the above variation of the drive torque distribution ratio in accordance with the surface resistance is well known in the art, this will now be described briefly. Due to axial components of the forces applied from the screw gear portions 61 and 71 of the element gears 60 and 70 respectively to the screw gear portions 42a and 52a of the side gears 40 and 50, a frictional force develops between the side gears 40 and 50, for example, through the washer 85, and a frictional force develops between the side gear 50 and the end wall 13 of the housing 10 through the washers 83 and 84. The torque distribution ratio is varied by these frictional forces, etc.

In this embodiment, as described above, in the basic condition, the drive torque distributed to the rear propeller shaft 30 is greater than the drive torque distributed to the front propeller shaft 20, and therefore the manner of varying the drive torque distribution ratio is different from that used in the conventional device. More specifically, the range of variation of the torque distribution ratio is shifted in such a direction that the drive torque distributed to the rear propeller shaft 30 is increased. For example, if the torque distribution ratio ($T_F:T_R$) in the basic condition is 45:55, this torque distribution ratio varies in the range of between 20:80 and 70:30. If the torque distribution ratio ($T_F:T_R$) in the basic condition 35:65, this ratio varies in the range of between 10:90 and 60:40.

As described above, the ratio of the drive torque of the rear wheels to the drive torque of the front wheels can be increased, the device is suited for a vehicle of the type bearing a greater load at the rear side. More specifically, the front wheels bearing a smaller load are subjected to a low surface resistance, and the critical value causing slip of the front wheels is low, and therefore the drive torque of the front wheels can easily reach this critical value. At this time, the torque distribution ratio ($T_F:T_R$) varies in such a manner that the drive torque of the rear wheels is increased. Even if the drive torque of the front wheels is small, the upper limit of the above distribution ratio is, for example, 10:90, and hence the drive torque of the rear wheels can be about nine times greater than the drive torque of the front wheels. Therefore, the drive torque transmitted from the engine can be fully utilized to thereby apply a sufficient propelling force to the vehicle. Particularly, at the time of an abrupt start of the vehicle or at the time of going up a slope, a greater load acts on the rear side of the vehicle, so that the surface resistance of the rear wheels greatly differs from the surface resistance of the front wheels. Even in such a case, with the above distribution ratio of 10:90, the drive torque from the engine can be utilized to the maximum level.

In addition, the extent of variation of the above torque distribution ratio is generally the same as that in the conventional construction, and therefore a smooth differential function and a long service life can be ensured.

In this embodiment, the ratio of the number of teeth of the screw gear portion 42a of the front side gear 40 to the number of teeth of the screw gear portion 61 of the front element gear 60 is equal to the ratio of the number of teeth of the screw gear portion 52a of the rear side gear 50 to the number of teeth of the screw gear portion 71 of the rear element gear 70. Therefore, in a differential condition, if the rotational speed of the housing 10 is represented by $N_0$, the rotational speed of one of the two propeller shafts 20 and 30 is represented by ($N_0+a$), and the rotational speed of the other is represented by ($N_0-a$). Thus, the rotational speeds of the two propeller shafts 20 and 30 differ the same amount a from the rotational speed of the housing 10.

Other preferred embodiments of the invention will now be described. Those parts of these embodiments corresponding to those of the preceding embodiment are denoted by the same reference numerals, respectively, and detailed explanation of such corresponding parts will be omitted here.

In the embodiment shown in FIG. 4, pitch diameters $D_F$ and $D_R$ of screw gear portions 42a and 52a of side gears 40 and 50, pitch diameters $D_{EF}$ and $D_{ER}$ of screw gear portions 61 and 71 of element gears 60 and 70, and pitch diameters $D_{SF}$ and $D_{SR}$ of spur gear portions 62 and 72 of the element gears 60 and 70 are the same as those in the embodiment of FIG. 1. However, circular pitches $P_F$ and $P_R$ of the screw gear portions 42a and 52a are different from each other, and this ratio ($P_F:P_R$) is equal to the ratio ($D_F:D_R$) between the pitch diameters, as indicated by the following formula:

$$P_F:P_R=D_F:D_R$$

Therefore, the number of teeth of the screw gear portion 42a is equal to the number of teeth of the screw gear portion 52a. The circular pitches of the screw gear portions 61 and 71 of the element gears 60 and 70 are equal to the circular pitches of the screw gear portions 42a and 52a, respectively, and the ratio between the circular pitches of the screw gear portions 61 and 71 is equal to the ratio between the pitch diameters $D_{SF}$ and $D_{SR}$ of the screw gear portions 61 and 71. Therefore, the number of teeth of the screw gear portion 61 is equal to the number of teeth of the screw gear portion 71. Therefore, in this embodiment, also, in a differential condition, the difference between the rotational speed of a housing 10 and the rotational speed of one of two propeller shafts 20 and 30 is equal to the difference between the rotational speed of the housing 10 and the rotational speed of the other propeller shaft.

In the embodiment shown in FIG. 5, although side gears 40 and 50 are identical in shape to those of FIG. 1, respectively, element gears 60 and 70 are different from those of FIG. 1. Pitch diameters $D_{EF}$ and $D_{ER}$ of screw gear portions 61 and 71 of the element gears 60 and 70 are equal to each other. However, pitch diameters $D_{SF}$ and $D_{SR}$ of spur gear portions 62 and 72 are different from each other, and are inversely proportional to diameters $D_F$ and $D_R$ of screw gear portions 42a and 52a, as indicated in the following formula:

$$D_{SF}:D_{SR}=D_R:D_F$$

Therefore, in the embodiment of FIG. 5, also, in a differential condition, the difference between the rotational speed of a housing 10 and the rotational speed of one of two propeller shafts 20 and 30 is equal to the difference between the rotational speed of the housing 10 and the rotational speed of the other propeller shaft.

In the embodiment shown in FIG. 6, although side gears 40 and 50 are identical in shape to those of FIG. 1, respectively, element gears 60 and 70 are different from those of FIG. 1. More specifically, in this embodiment, the element gears 60 and 70 are identical in shape to each other. In this embodiment, the difference between the rotational speed of a housing 10 and the rotational speed of one of two propeller shafts 20 and 30 is different from the different between the rotational speed of the housing 10 and the rotational speed of the other propeller shaft.

The invention is not limited to the above embodiments shown in FIGS. 1 to 6, and the shapes of the side gears and the element gears can be changed variously on condition that the pitch diameters of the screw gear portions 42a and 52a of the side gears 40 and 50 are different from each other.

In the embodiment shown in FIG. 7, pitch diameters $D_F$ and $D_R$ of screw gear portions 42a and 52a of side gears 40 and 50 are equal to each other. Pitch diameters $D_{EF}$ and $D_{ER}$ of screw gear portions 61 and 71 of element gears 60 and 70 are equal to each other. Pitch diameters $D_{SF}$ and $D_{SR}$ of spur gear portions 62 and 72 are equal to each other. However, a helix angle $\theta_R$ of the screw gear portion 52a of the rear side gear 50 is smaller than a helix angle $\theta_F$ of the screw gear portion 42a of the front side gear 40. Helix angles of the screw gear portions 61 and 71 of the element gears 60 and 70 are represented by ($90°-\theta_F$) and ($90°-\theta_R$), respectively, and are different from each other. In the basic condition, at the rear side gear 50 having a smaller helix angle $\theta_R$, a circumferential component of the force transmitted from each element gear 70 to the rear side gear 50 is large, and therefore the transmitted drive torque is large. On the other hand, at the front side gear 40 having a larger helix angle $\theta_F$, a circumferential component of the force transmitted from each element gear 60 to the side gear 40 is small, and therefore the transmitted drive torque is small. Therefore, as in all of the above embodiments, the range of variation of the torque distribution ratio is shifted in such a direction that the drive torque distributed to the rear propeller shaft 30 is increased.

In order for the drive torques of the pair of propeller shafts to differ from each other in the basic condition, the diameters of the screw gear portions of the pair of side gears may be different from each other, and further the helix angles of these screw gear portions may be different from each other.

In a vehicle of the type in which the front wheels bear a greater load than the rear wheels, the drive torque distributed to the front wheels in the basic condition may be increased.

The center differential devices of the above embodiments can be applied to a vehicle of the type in which an abrupt start performance is considered as being important although the load is borne generally uniformly on the front and rear wheels.

The embodiment shown in FIG. 8 differs from the embodiment of FIG. 1 in the following respects. A front side gear 40 has a first portion 41 and a second portion 42 which are arranged along the axis of the side gear 40. The outer diameter of the first portion 41 close to an end wall 12 of a housing 10 is greater than the outer diameter of the second portion 42 remote from the end wall 12. The first portion 41 has a bore 43 extending axially from one end remote from the second portion 42, and a spline portion 41a is formed on the inner periphery of the bore 43. The second portion 42 is solid and has a cylindrical shape, and a screw gear portion 42a is formed on the outer periphery of the second portion 42. One end of a front propeller shaft 20 is received in the bore 43 of the first portion 41, and a transmission of rotation between the propeller shaft 20 and the first portion 41 is achieved by connection between their spline portions 41a and 20a.

A rear side gear 50 also has a first portion 51 and a second portion 52 which are arranged along the axis of the side gear 50. A bore 53 is formed in the first portion 51, and a bore 55 of a smaller diameter is formed in the second portion 52, the bore 55 being disposed coaxially with the bore 53 and communicating with the bore 53. A spline portion 51a is formed in the inner periphery of the bore 53. A transmission of rotation between the side gear 50 and a rear propeller shaft 30 is achieved by connection between their spline portions 51a and 30a. The rear propeller shaft 30 has a projection 35 of a smaller diameter extending forwardly from the spline portion 30a, and this projection 35 is received in the bore 55. With this arrangement, even when large forces are applied from element gears 70 to the side gear 50, the axis of rotation of the side gear 50 can be positively kept aligned with the axis of rotation of the rear propeller shaft 30. A screw gear portion 52a is formed on the outer periphery of the second portion 52.

Figure 8:
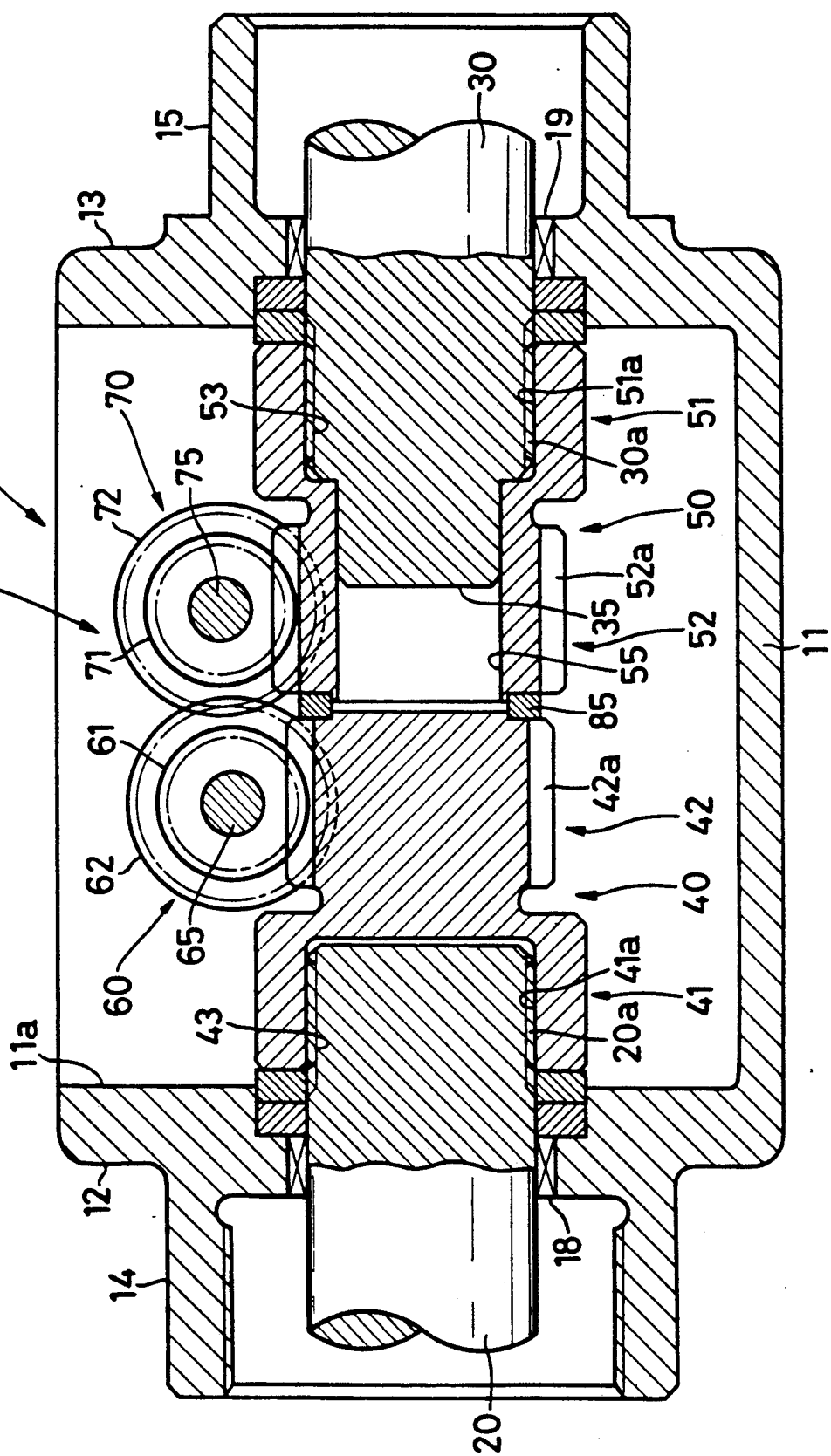
FIGS. 8 to 10 are views similar to FIG. 1, but showing further modified differential devices, respectively.

In the embodiment shown in FIG. 8, as in the embodiments of FIGS. 1 to 6, the pitch diameter of the screw gear portion 52a of the rear side gear 52 is greater than the pitch diameter of the screw gear portion 42a of the front side gear 40.

For better understanding of advantages of the embodiment of FIG. 8, this embodiment will now be compared with the embodiments of FIGS. 1 to 6.

In the embodiments of FIGS. 1 to 6, the pitch diameter of the screw gear portion 42a of the front side gear 40 must be generally the same as that in the prior art, because it is necessary to secure an adequate diameter of the spline portion 41a and an adequate thickness of the peripheral wall of the side gear 40. For this reason, the diameter of the screw gear portion 52a of the rear side gear 50 must be made considerably large, and as a result the element gears 70 in mesh with the screw gear portion 52a are considerably remote from the axis of rotation of the side gears 40 and 50. The result is that the diameter of the housing 10 and hence the diameter of the differential case must be increased.

On the other hand, in the embodiment shown in FIG. 8, the diameter of the screw gear portion 42a of the front side gear 40 is reduced, thereby avoiding the situation that the pitch diameter of the screw gear portion 52a of the rear side gear 50 becomes greater than that in the prior art. As a result, the diameter of the housing 10 as well as the diameter of the differential case can be kept to a small size. The reason that the diameter of the screw gear portion 42a can be reduced is as follows. In the front side gear 40, the screw gear portion 42a is spaced from the spline portion 41a along the axis of the side gear 40, and therefore the diameter of the spline portion 41a is not limited by the diameter of the screw gear portion 42a. Therefore, even if the diameter of the screw gear portion 42a is reduced, the diameter of the spline portion 41a can be made sufficiently large, and also the thickness of the peripheral wall surrounding the spline portion 41a can be made sufficiently large. In other words, the spline portion 41a as well as the peripheral wall surrounding this spline portion can have a sufficient strength required to transmit the drive torque from the side gear 40 to the front propeller shaft 20.

In this embodiment, the diameter of the root circle of the screw gear portion 42a is substantially equal to the diameter of the spline portion 41a. Element gears 60 are not arranged around the outer periphery of the peripheral wall surrounding the spline portion 41a, and therefore the thickness of this peripheral wall does not directly influence the diameter of the housing 10.

In the embodiment of FIG. 8, also, in the rear side gear 50, the screw gear portion 52a is spaced from the spline portion 51a along the axis of the side gear 50, and therefore the diameter of the screw gear portion 52a can be reduced, thereby further reducing the diameters of the housing 10 and the differential case.

Figure 9:
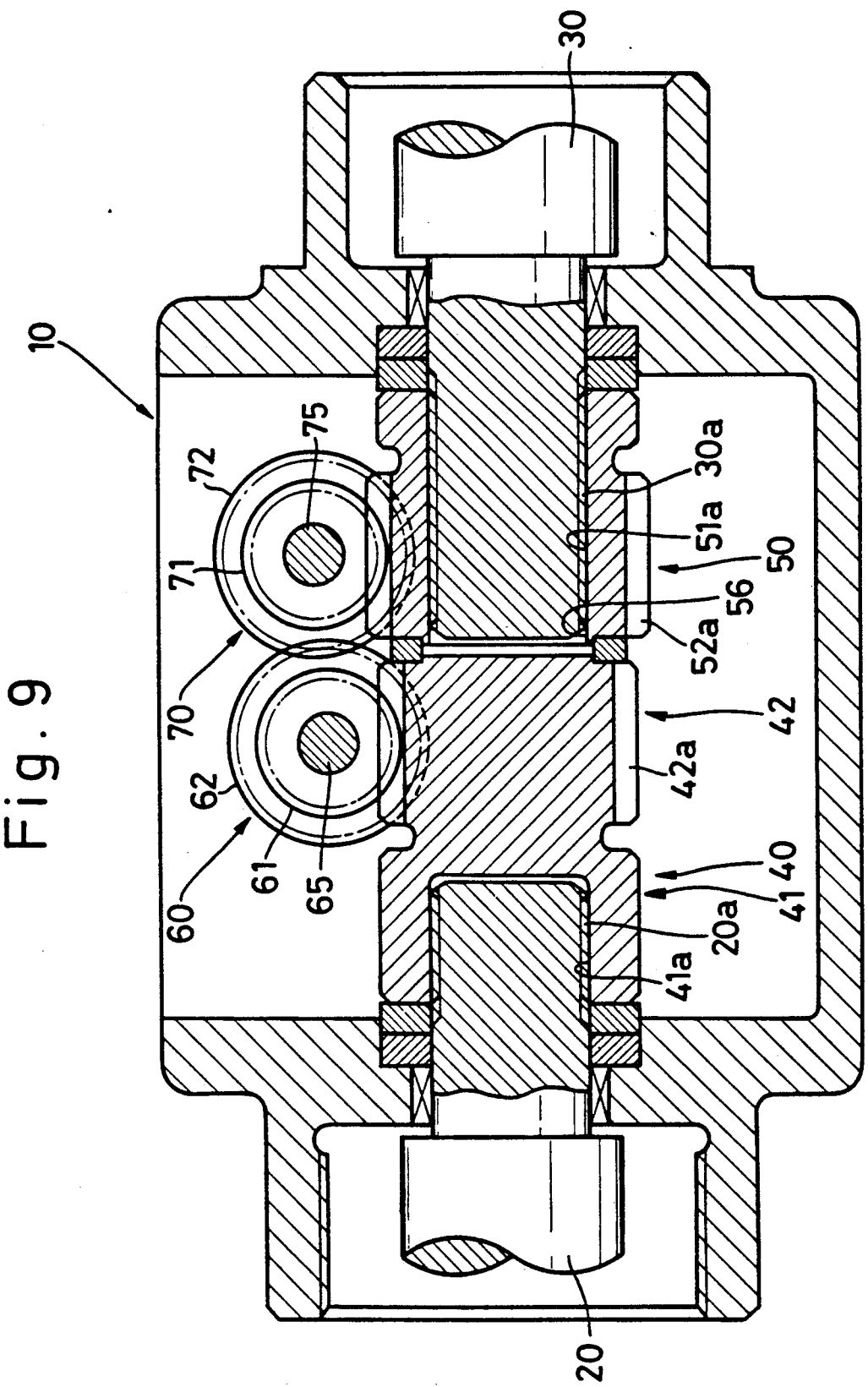

In the embodiment shown in FIG. 9, the pitch diameters of screw gear portions 42a and 52a of side gears 40 and 50 are different from each other, as in the embodiment of FIG. 8. However, in the embodiment of FIG. 9, only with respect to the front side gear 40, a spline portion 41a is spaced from the screw gear portion 42a along the axis of the side gear 40. The rear side gear 50 has a bore 56 axially extending therethrough, and a spline portion 51a is formed on the inner surface of the bore 56 generally over the entire length thereof. The spline portion 51a of the rear side gear 50 and a spline portion 30a of a rear propeller shaft 30 in mesh therewith are substantially equal in diameter to the spline portion 41a of the front side gear 40 and a spline portion 20a of a front propeller shaft 20 in mesh therewith; however, the spline portions 51a and 30a are longer than the spline portions 41a and 20a, and therefore can withstand the transmission of a greater drive torque.

Figure 10:
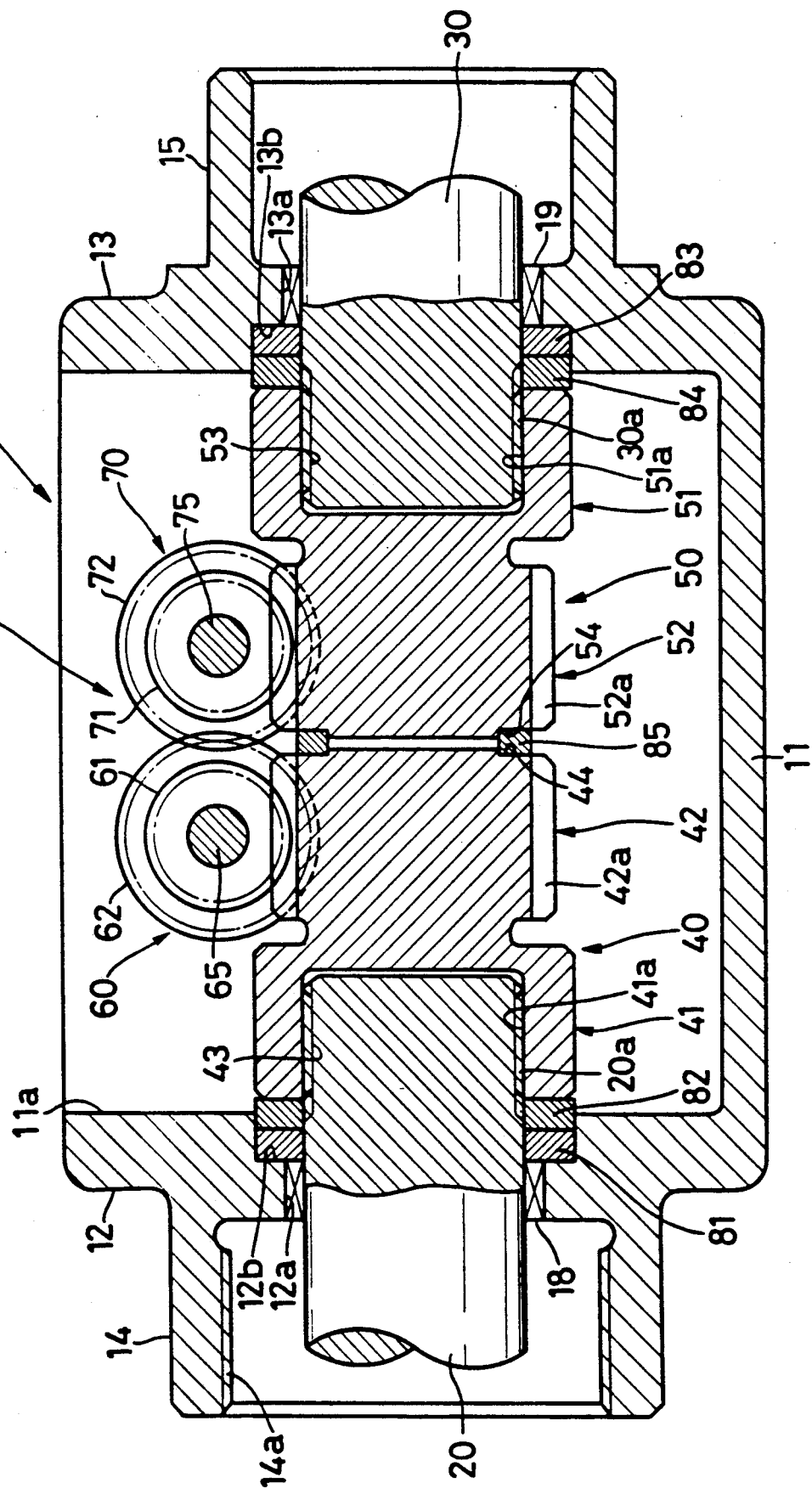

In the embodiment shown in FIG. 10, the techniques of FIGS. 8 and 9 are applied to a differential device of the type in which pitch diameters of screw gear portions 42a and 52a are equal to each other, and the drive torque distribution ratio in the basic condition is 50:50. A front side gear 40 is identical in shape to that in FIG. 8. A rear side gear 50 has the same shape as the front side gear 40, and has a first portion 51 and a second portion 52. The first portion 51 has an axial bore 53 formed therein, and a spline portion 51a is formed on the inner surface of the bore 53. The screw gear portion 52a is formed on the outer periphery of the second portion 52. The rear side gear 50 is coupled to one end of a rear propeller shaft 30 by spline-connection. In this embodiment, since the diameters of the screw gear portions 42a and 52a of the side gears 40 and 50 are small, element gears 60 and 70 meshing respectively with these screw gear portions can be disposed closer to the axis of rotation of the side gears 40 and 50. Therefore, the diameter of the housing 10 and hence the diameter of the differential case can be made small.

In the embodiments of FIGS. 8 to 10, since the diameter of the differential devices can be kept to a small size, the passenger room or cabin of the vehicle can be increased vertically without increasing the height of the vehicle. Although these differential devices have a greater axial length as compared with the conventional construction, this will not offer any problem since the vehicle has a sufficient space in such a direction.

The use of the device of FIG. 10 is not limited to a center differential device, but is applicable as a front differential device or a rear differential device.

The present invention are not to be restricted to the above embodiments, and various modifications can be made. For example, each of the coupling gear portions of each element gear may be in the form of a helical gear, instead of a spur gear. The coupling gear portions of each element gear may indirectly mesh respectively with the coupling gears of its mating element gear via respective idle gears.

What is claimed is:

1. A differential device for use in a vehicle having front wheels and rear wheels, comprising:
   (a) a housing connectable to a power source of the vehicle so as to be supplied with a drive torque;
   (b) a pair of front and rear propeller shafts operatively connected to the front and rear wheels, respectively, said pair of propeller shafts extending along a common straight line into said housing, so that one end of each of said two propeller shafts are disposed in opposing relation to each other within said housing;
   (c) a pair of side gears connected respectively to said ends of said pair of front and rear propeller shafts so as to transmit rotations of said two side gears respectively to said two propeller shafts, each of said two side gears having a screw gear portion on its outer periphery, with pitch diameters of said screw gear portions of said two side gears being equal to each other, and helix angles of said screw gear portions of said pair of side gears being different from each other; and
   (d) at least one pair of element gears each rotatably mounted on said housing, an axis of rotation of each of said element gears being skew relative to the axis of rotation of said propeller shafts and the axis of rotation of said side gears, each of said element gears having a screw gear portion and a coupling gear portion, said screw gear portions of said pair of element gears meshing with said screw gear portions of said pair of side gears, respectively, and said coupling gear portions of said pair of element gears meshing with each other.

2. A differential device according to claim 1, in which the helix angle of said screw gear portion of said side gear connected to said rear propeller shaft is smaller than the helix angle of said screw gear portion of said side gear connected to said front propeller shaft.

3. A differential device for use in a vehicle having wheels, comprising:
   (a) a housing connectable to a power source of the vehicle so as to be supplied with a drive torque;
   (b) a pair of shafts each operatively connected to a respective one of the wheels, said pair of shafts extending along a common straight line into said housing, so that one end of one of said two shafts is disposed in opposed relation to one end of the other of said two shafts within said housing, and each of said shafts having a spline portion formed on an outer periphery of said one end thereof;
   (c) a pair of hollow side gears connected respectively to said pair of shafts, each of said side gears having a screw gear portion formed on its outer periphery and a spline portion formed on its inner periphery, said spline portions of said two side gears being connected respectively to said spline portions of said two shafts so as to transmit rotations of said two side gears respectively to said shafts, and said screw gear portion and said spline portion of at least one of said two side gears being spaced from each other along an axis of said side gear, said spline portion of said one side gear being disposed more remotely from the other side gear than said screw gear portion of said one side gear; and
   (d) at least one pair of element gears each rotatably mounted on said housing, an axis of rotation of each of said element gears being skew relative to the axis of said shafts and the axis of rotation of said side gears, each of said element gears having a screw gear portion and a coupling gear portion, said screw gear portions of said pair of element gears meshing with said screw gear portions of said pair of side gears, respectively, and said coupling gear portions of said pair of element gears meshing with each other.

4. A differential device according to claim 3, in which pitch diameters of said screw gear portions of said pair of side gears are different from each other, said screw gear portion and said spline portion of said side gear whose screw gear portion has a smaller pitch diameter being spaced from each other along an axis of said side gear.

5. A differential device according to claim 4, in which said spline portion and said screw gear portion of said side gear whose screw gear portion has a larger pitch diameter overlap each other in the direction of the axis of said side gear, said spline portion of said side gear whose screw gear portion has a larger pitch diameter being longer than said spline portion of said side gear whose screw gear portion has a smaller pitch diameter.

6. A differential device according to claim 3, in which said pair of side gears are identical in shape to each other, said screw gear portion and said spline portion of each of said two side gears being spaced from each other along an axis of said side gear.

7. A differential device according to claim 3, wherein said one side gear has a tubular section surrounding said spline portion, and wherein an outer diameter of said tubular section being greater than a pitch diameter of said screw gear portion of said one side gear.

8. A differential device according to claim 7, wherein a diameter of a root circle of said screw gear portion of said one side gear is substantially equal to a diameter of said spline portion of said one side gear.

9. A differential device according to claim 3, wherein said one side gear has a first tubular section and a second tubular section coaxially disposed such that the second tubular section is adjacent the other side gear, wherein said spline portion is formed on an inner periphery of said first tubular section and said screw gear portion is formed on an outer periphery of said second tubular section, and wherein said one of said pair of shafts corresponding to said one side gear has a projection extending forwardly from said spline portion of said one shaft, said projection being smaller in diameter than said spline portion of said one shaft, and said projection being received in said second tubular section of said one side gear.

10. A differential device according to claim 3, wherein said screw portion is formed on an outer periphery of a solid section of said one side gear.

11. A differential device according to claim 3, wherein said one side gear has a first tubular section and a second tubular section coaxially disposed, respectively, toward the other side gear, said spline portion being formed on an inner periphery of said first tubular section, said screw gear portion being formed on an outer periphery of said second tubular section, and wherein an inner diameter of said second tubular portion is smaller than that of said first tubular portion.

* * * * *